(12) United States Patent
Wang et al.

(10) Patent No.: US 12,219,010 B2
(45) Date of Patent: Feb. 4, 2025

(54) CROSS-SITE HIGH-AVAILABILITY DISTRIBUTED CLOUD STORAGE SYSTEM TO MONITOR VIRTUAL CHANNELS BETWEEN STORAGE NODES AND PREVENT CHANNEL SHARING OF A RECEIVE QUEUE

(71) Applicant: NetApp, Inc., San Jose, CA (US)

(72) Inventors: Yanbei Wang, Southborough, MA (US); Houze Xu, Lexington, MA (US)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 18/467,370

(22) Filed: Sep. 14, 2023

(65) Prior Publication Data

US 2024/0121298 A1    Apr. 11, 2024

Related U.S. Application Data

(63) Continuation of application No. 17/960,602, filed on Oct. 5, 2022, now Pat. No. 11,785,086.

(51) Int. Cl.
*H04L 67/1097* (2022.01)
*H04L 67/1023* (2022.01)
*H04L 67/141* (2022.01)

(52) U.S. Cl.
CPC ...... *H04L 67/1097* (2013.01); *H04L 67/1023* (2013.01); *H04L 67/141* (2013.01)

(58) Field of Classification Search
CPC ............ H04L 67/1097; H04L 67/1023; H04L 67/141
See application file for complete search history.

(56) References Cited

U.S. PATENT DOCUMENTS 11,785,086 B1    10/2023  Wang et al.
2004/0258073 A1*  12/2004  Alexander ............. H04L 45/50
                                                 370/395.5

(Continued)

FOREIGN PATENT DOCUMENTS

CN        113783973 A    12/2021

OTHER PUBLICATIONS

"Introduction to Receive Side Scaling," Mar. 16, 2022, https://learn.microsofl.com/en-us/windows-hardware/drivers/network/introduction-to-receive-side-scaling, downloaded Oct. 5, 2022, 5 pages.

(Continued)

*Primary Examiner* — Jonathan A Bui
(74) *Attorney, Agent, or Firm* — Jaffery Watson Hamilton & DeSantis LLP

(57) ABSTRACT

According to one embodiment, a computer implemented method comprises providing multiple channels between a first storage node and a second storage node with each channel having a separate network connection for packets of a transport layer session, assigning packets from each channel to a group of receive queues of the second storage node, continuously monitoring whether two or more channels of the multiple channels share a same receive queue of the second storage node, and sending a communication via a channel to the first storage node to indicate a dynamic change in a hash input field (e.g., a source port, a destination port, a source internet protocol (IP) address, and a destination IP address) when two or more channels of the multiple channels share a same receive queue of the second storage node.

20 Claims, 10 Drawing Sheets

(56) References Cited

U.S. PATENT DOCUMENTS

| | | | | |
|---|---|---|---|---|
| 2009/0180493 A1* | 7/2009 | Hirano | .................. | H04L 12/185 |
| | | | | 370/464 |
| 2014/0059111 A1* | 2/2014 | Veeraiyan | ............... | H04L 67/10 |
| | | | | 709/201 |
| 2016/0105377 A1* | 4/2016 | Nakagawa | .......... | H04L 49/3009 |
| | | | | 370/392 |
| 2019/0394308 A1* | 12/2019 | Balasubramanian | ........................ | |
| | | | | H04L 69/164 |
| 2020/0036636 A1* | 1/2020 | Holla | .................... | H04L 47/125 |
| 2020/0314181 A1* | 10/2020 | Eran | ....................... | H04L 67/10 |

OTHER PUBLICATIONS

Notice of Allowance mailed on Jun. 7, 2023 for U.S. Appl. No. 17/960,602, filed Oct. 5, 2022, 9 pages.

* cited by examiner

CROSS-SITE HIGH-AVAILABILITY DISTRIBUTED CLOUD STORAGE SYSTEM TO MONITOR VIRTUAL CHANNELS BETWEEN STORAGE NODES AND PREVENT CHANNEL SHARING OF A RECEIVE QUEUE

RELATED APPLICATIONS

This application is a continuation of U.S. patent application Ser. No. 17/960,602, filed Oct. 5, 2022, which is hereby incorporated by reference in its entirety for all purposes.

FIELD

Various embodiments of the present disclosure generally relate to multi-site distributed data storage systems. In particular, some embodiments relate to a cross-site high-availability distributed cloud storage system (e.g., cross-site high-availability (HA) storage solutions) to monitor virtual interconnect (IC) channel between storage nodes to prevent two or more virtual channels from sharing a receive queue of a storage node.

BACKGROUND

Multiple storage nodes organized as a cluster may provide a distributed storage architecture configured to service storage requests issued by one or more clients of the cluster. The storage requests are directed to data stored on storage devices coupled to one or more of the storage nodes of the cluster. The data served by the storage nodes may be distributed across multiple storage units embodied as persistent storage devices, such as hard disk drives (HDDs), solid state drives (SSDs), flash memory systems, or other storage devices. The storage nodes may logically organize the data stored on the devices as volumes accessible as logical units. Each volume may be implemented as a set of data structures, such as data blocks that store data for the volume and metadata blocks that describe the data of the volume.

Business enterprises rely on multiple clusters for storing and retrieving data. Each cluster may be a separate data center with the clusters able to communicate over an unreliable network. Cloud service providers support different algorithms for distributing network traffic data to a remote storage node and this can cause performance issues.

SUMMARY

Systems and methods are described for a cross-site high-availability distributed cloud storage system (e.g., cross-site high-availability (HA) storage solutions) to provide and monitor multiple channels between storage nodes (e.g., multiple physical channels between physical storage nodes and multiple virtual channels between virtual storage nodes). According to one embodiment, a method is performed by one or more processing resources of a first storage node or a second storage node of a distributed cloud storage system. The computer implemented method comprises providing multiple channels between the first storage node and the second storage node with each channel having a separate network connection for packets of a transport layer session, assigning packets from each channel to a group of receive queues of the second storage node, continuously monitoring whether two or more channels of the multiple channels share a same receive queue of the second storage node, and sending a communication via a channel to the first storage node to indicate a dynamic change in a hash input field (e.g., a source port, a destination port, a source internet protocol (IP) address, and a destination IP address) when two or more channels of the multiple channels share a same receive queue of the second storage node.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
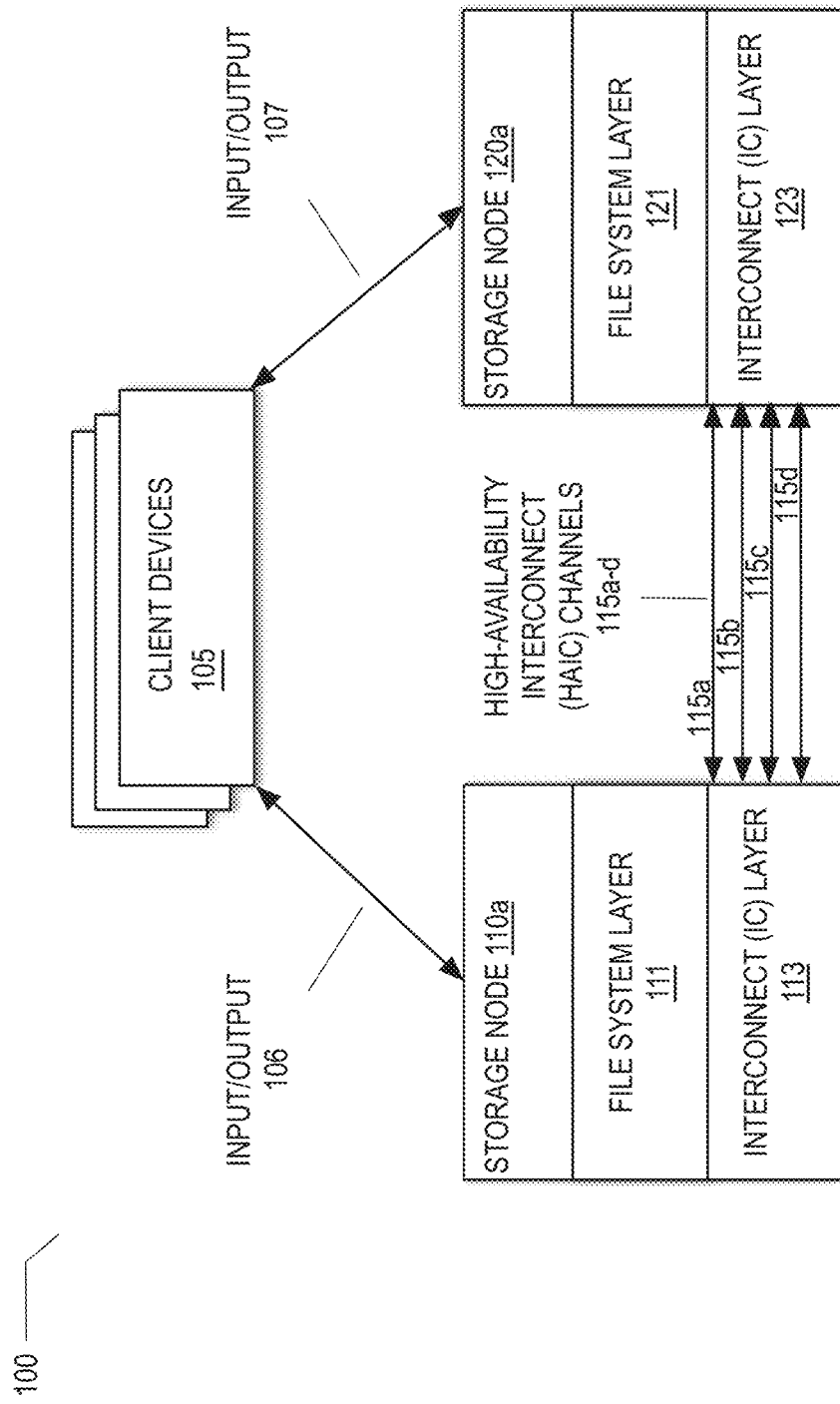
FIG. 1 is a block diagram illustrating an environment 100 in which various embodiments may be implemented.

Systems and methods are described for a cross-site high-availability distributed cloud storage system (e.g., cross-site high-availability (HA) storage solutions) to provide and monitor multiple interconnect (IC) channels (e.g., multiple virtual channels for a virtual implementation) between storage nodes for improved performance. According to one embodiment, a method is performed by one or more processing resources of a first storage node or a second storage node of a distributed cloud storage system. The computer implemented method comprises providing multiple channels between the first storage node and the second storage node with each channel having a separate network connection for packets of a transport layer session, assigning packets from each channel to a group of receive queues of the second storage node, continuously monitoring whether two or more channels of the multiple channels share a same receive queue of the second storage node, and sending a communication via a channel to the first storage node to indicate a dynamic change in a hash input field (e.g., a source port, a destination port, a source internet protocol (IP) address, and a destination IP address) when two or more channels of the multiple channels share a same receive queue of the second storage node.

A software implementation of Remote Direct Memory Access (RDMA) can be used for data transfer including mirroring of data from a first storage node to a peered second storage node. UDP is used in a transport layer for transporting data between source and destination nodes in some cloud volume solutions. Most of the data is from channels for parallel processing. It is desired that each channel has its own receive queue for best performance. Each channel can have its own source and destination port.

Receive-Side Scaling (RSS), also known as multi-queue receive, distributes network receive processing across several hardware-based receive queues, allowing inbound network traffic to be processed by multiple CPUs. RSS does not guarantee a separate receive queue for each channel.

The challenges for efficient data transfer include some cloud service providers not supporting RSS, and even if the cloud service provider supports RSS, some cloud service provider may not use well known algorithms. Moreover, out of the hash input fields (e.g., source IP address, destination IP address, source port and destination port) used for receive hash, source and destination IPs are decided at deployment, when source and destination ports are fixed. Thus, the hash algorithm can put different channels on a same receive queue and this causes performance issues. To address this technical problem, systems and methods of the present disclosure provide a protocol to change a hash input field of a tuple dynamically until each channel has its own receive queue.

In one example, methods of the present disclosure enable a data transfer (e.g., any type of data transfer, replicate copies of journal log of client data transfer requests) of a client device from the first storage node to the remote second storage node with multiple channels. A storage server such as a storage node of a primary storage site can be used to backup critical data, among other purposes. A data backup technique known as "mirroring" involves backing up data stored at a primary site by replicating an exact copy (a mirror image) of the data at a remote secondary site. If data is ever lost at the primary storage site, it can be recovered from the secondary storage site.

The primary storage site receives and responds to various read and write requests from client devices. In a system which handles large volumes of client requests, it may be impractical to commit data modification requests to the mass backend storage devices connected to the storage nodes every time a data modification request is received from a client because backend storage device/disk accesses tend to take a relatively long time compared to in-memory operations. Therefore, the primary storage site may instead hold write requests in memory temporarily and only periodically save the modified data to the mass storage devices, such as every few seconds. The event of saving the modified data to the mass storage devices is called a consistency point. At a consistency point, the primary storage site saves any data that was modified by the write requests to its local mass storage devices and triggers a process of updating the data stored at the mirror secondary storage site to reflect an updated primary volume at the primary storage site.

In this approach, there is a small risk of a system failure occurring between consistency points, causing the loss of data modified after the last consistency point. Consequently, in at least one approach, the primary storage site includes a non-volatile random access memory (NVRAM) in which NV memory maintains a journal log of data modification requests received from clients since the last consistency point. The journal log includes a separate entry for each data modification request received from a client since the last consistency point. Each log entry comprises of the data modification requests as received from the storage client including the new data required to be committed to the storage. The log is only used in the event of a failure, to recover and commit the data since the last consistency point that would otherwise be lost. In the event of a failure, it may be possible to replay the log to reconstruct the state of stored data to recover from the failure. In one example, after each consistency point is completed, the log holding entries committed as part of last consistency point is discarded and a new log is started.

To protect against a failure of the primary storage site (including journal log), an approach called clustered failover (CFO) is used in which the primary and the secondary storage sites operate as "high availability partners' and are connected with a single interconnect channel that mirrors the log entries across the "high-availability" partners. In the event of failure of a node, its high-availability partner replays the log from its copy to reconstruct an up-to-date version of the stored data. Therefore, it is important that this log be replicated to its HA partner and is always up to date across all its copies. This also implies that any incoming data-modification request be committed (via IC) across all copies of the log before the data-modification request is acknowledged back to the client.

Embodiments described herein seek to improve various technological processes associated with cross-site storage solutions and overcome network traffic limitations for an IC channel (especially in a cloud like environment that typically limits the single flow/channel bandwidth) used to replicate client data requests (e.g., data modification requests) between primary and secondary storage sites. Various embodiments of the present technology provide for a wide range of technical effects, advantages, and/or improvements to stretched storage systems and participating distributed storage systems. For example, various embodiments may include one or more of the following technical effects, advantages, and/or improvements: (i) improve throughput and reduce latency for data transfers between primary storage nodes and mirrored secondary storage nodes for private or public cloud environments, typically with no hardware accelerator being available for a storage node in virtual or cloud environments, (ii) monitoring multiple channels to determine if any two channels share a same receive queue and then dynamically adjusting a hash input field of a hash tuple to change a receive queue for a channel to ensure that channels do not share a same receive queue, and (iii) distribute data traffic evenly across processing resources to minimize latency for client devices. One or more of which may include various additional optimizations described further below.

In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Terminology

Brief definitions of terms used throughout this application are given below.

A "computer" or "computer system" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to "a computer" or "a computer system" herein may mean one or more computers, unless expressly stated otherwise.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

Example Operating Environment

FIG. 1 is a block diagram illustrating an environment 100 in which various embodiments may be implemented. In various examples described herein, multiple storage nodes (e.g., storage nodes 110a and 120a) may be part of a storage solution providing high availability (HA) and/or disaster recovery (DR) in which the storage nodes reside in different fault domains (e.g., power and/or networking failure domains) and/or in different regions (e.g., geographically distributed data centers, private or public cloud provider availability zones). Depending upon the particular implementation, one or both of the storage nodes may be represented in physical or virtual form. Non-limiting examples of storage nodes in physical form include network storage systems or appliances that are capable of supporting one or both of Network Attached Storage (NAS) and Storage-Area Network (SAN) accessibility from a single storage pool, which may be referred to as Fabric Attached Storage (FAS). A storage node represented in virtual form having an operating system that includes a software stack (e.g., file system layer, an interconnect (IC) layer, an IC transport layer, device driver) may be implemented as a virtual machine (VM) or container within a private or public cloud (e.g., cloud service provider). A system memory of the VM or container can store data (e.g., NV data, NV log data).

The storage nodes may represent special purpose nodes operable to provide file services relating to the organization of information on storage devices associated with the storage nodes. A non-limiting example of such special purpose node includes a "filer," which may represent a high-performance all flash FAS (AFF) storage array scalable to terabytes of data that presents storage over the network using various protocols (e.g., Internet small computer system interface (iSCSI), Fibre Channel (FC), common Internet file system (CIFS), network file system (NFS), hypertext transfer protocol (HTTP), web-based distributed authoring and versioning (WebDAV)) or a custom protocol. The "filer" may be configured to operate according to a client/server model of information delivery to thereby allow many clients devices 105 to access files stored on a server, e.g., the filer. In this model, the client may comprise an application, such as a database application, executing on a computer that "connects" to the filer over a computer network, such as a point-to-point channel, shared local area network (LAN), wide area network (WAN), or virtual private network (VPN) implemented over a public network, such as the Internet. The clients may request services of a storage node by issuing Input/Output requests 106 or 107 (e.g., file system protocol messages (in the form of packets) over the network).

The data served by the storage nodes may be distributed across multiple storage units embodied as persistent storage devices, such as hard disk drives (HDDs), solid state drives (SSDs), flash memory systems, or other storage devices. The storage nodes may logically organize the data stored on the devices as volumes accessible as logical units. Each volume may be implemented as a set of data structures, such as data blocks that store data for the volume and metadata blocks that describe the data of the volume.

In the context of the present example, storage node 110a has an operating system that includes a file system layer 111 and an interconnect (IC) layer 113. The IC layer 113 may optionally include an IC transport layer, which can be a software implementation of Remote Direct Memory Access (RDMA) and also a device driver. In computing, remote direct memory access (RDMA) is a direct memory access from the memory of one computer into that of another without involving either one's operating system. RDMA is a hardware mechanism through which the device driver (e.g., device driver for a network interface card (NIC)) can directly access all or parts of the main memory of a remote node without involving the processor. File system layer 111 may be a "write in-place" file system (e.g., the Berkeley fast file system) or a write-anywhere file system (e.g., the Write Anywhere File Layout (WAFL) file system available from NetApp, Inc. of San Jose, CA). The IC layer 113 provides an application programming interface (API) to upstream and downstream layers and abstracts the implementation of certain functionality performed on behalf of the file system layer 111. For example, the IC layer 113 may allow the storage node to check whether an HA or DR partner is functioning and/or to mirror data (e.g., log data) to and/or from the other's nonvolatile memory via one or more high-availability interconnect (HAIC) channels 115a-d (e.g., 2 to 8 HAIC channels), which can be virtual channels for a virtual storage node implementation. According to one embodiment, the IC layer 113 makes use of an IC transport layer to encapsulate RDMA frames within Ethernet packets for transmission via the HAIC channel 115a-d. The functionality of file system layer 121 and IC layer 123 of storage node 120a generally correspond to their respective counterparts in storage node 110a.

Depending upon the particular configuration, storage requests (e.g., Input/Output requests 106 and 107) may be directed to data stored on storage devices associated with one of the storage nodes. As described further below, certain types of storage requests may be logged (e.g., in the form of journal entries) to non-volatile random access memory (NVRAM) or local VM memory, as the case may be, and mirrored to the other storage node, which may represent an HA partner or a DR partner. Similarly, the data associated with the storage request may be synchronously, semi-synchronously, or asynchronously replicated to maintain consistency between datasets of the storage nodes to support continuous availability, for example, by failing over from one storage node to the other should one of the storage nodes become inaccessible to the client devices 105 for some reason.

While in the context of the present example, only two storage nodes are shown, it is to be appreciated storage nodes 110a and/or 120a may be part of a cluster of local and/or remote storage nodes depending upon the particular configuration. As such, a storage node may have more than one HA or DR partner in the same or a different data center or private or public cloud availability zone. The storage nodes 110a and 120a may be physical or virtual storage nodes.

While in the context of the present example, 4 channels (e.g., HAIC channels 115a-d) are shown for mirroring of data from storage node 110a to storage node 120a. It is to be noted, due to differences in the level of importance of efficiency and timely completion of data transfers and/or depending upon the particular implementation, mirroring of log data to an HA partner and the mirroring of log data to a DR partner may use different channels. For example, mirroring between or among HA partners may make use of the HAIC channels 115a-d, whereas mirroring to a DR partner may be via a different network channel (not shown).

Figure 2:
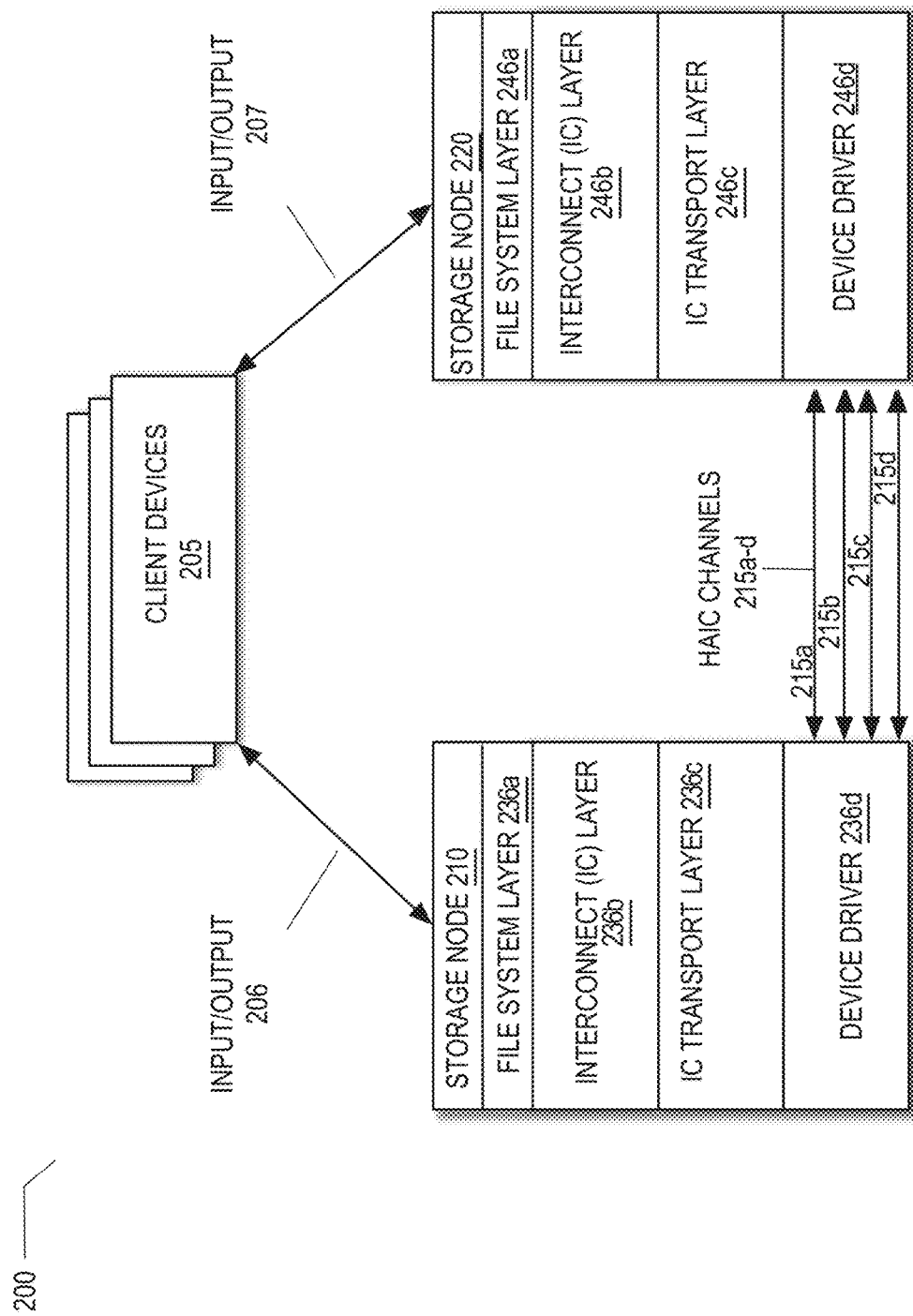
FIG. 2 is a block diagram illustrating a cross-site high-availability distributed cloud storage system to provide multiple communication channels between storage nodes.

FIG. 2 is a block diagram illustrating a cross-site high-availability distributed cloud storage system to provide multiple communication channels between storage nodes. In various examples described herein, users of client devices 205 of a multi-site distributed cloud storage system 200 having storage nodes 210 and 220 provide input/output requests 206 to storage node 210 and input/output requests 207 to storage node 220 via a browser-based interface presented on client devices 205.

In the context of the present example, the multi-site distributed cloud storage system 200 includes a storage node 210, a storage node 220, and interconnect (IC) channels 215a, 215b, 215c, and 215d. Additional or fewer IC channels can be supported (e.g., 2-8 channels). The storage nodes are coupled in communication via the IC channels 215a-d, which, depending upon the particular implementation, may be part of a Local Area Network (LAN), a Wide Area Network (WAN), or the Internet. The storage nodes can be virtual storage nodes 210 and 220 if implemented as a virtual machine (VM) or container within a private or public cloud.

Turning now to the storage node 210 (or virtual storage node 210), it includes an operating system having multiple software layers including a file system layer 236a, an IC layer 236b, an IC transport layer 236c, and a device driver 236d (e.g., storage driver, network interface card (NIC) driver). Application Programming Interfaces (API) may allow communications to or between these layers. In the context of the present example, the multiple storage nodes 210 and 220 are organized as a cluster and provide a distributed storage architecture to service storage requests 206 and 207 issued by one or more client devices or computer systems of the users. The data served by the storage nodes may be distributed across multiple storage units embodied as persistent storage devices (e.g., non-volatile memory), including but not limited to HDDs, SSDs, flash memory systems, or other storage devices. In a similar manner, storage node 220 includes an operating system with multiple software layers including a file system layer 246a, an IC layer 246b, an IC transport layer 246c, and a device driver 246d. For a virtual implementation of storage nodes 210 and 220, the data can be stored in persistent storage devices or memory of one or more virtual machines.

While for sake of brevity, only two storage nodes are shown in the context of the present example, it is to be appreciated that additional storage nodes or clusters owned by or leased by the same or different companies (data storage subscribers/customers) may be monitored and one or more metrics may be estimated based on data stored within a given level of a data store in accordance with the methodologies described herein and such clusters may reside in multiple data centers of different types (e.g., enterprise data centers, managed services data centers, or colocation data centers).

For any data modifying operation of an I/O request from a client device, a storage node 210 journals the operation locally in an Op log that can be stored locally and then the operation is mirrored across a channel (or virtual channel) to the storage node 220 before the storage node 210 can acknowledge back to the client device 205. After the acknowledgement back to the client device 205, then the operation entered into the Op log can be committed to storage devices for the storage nodes.

Two copies of data are desired for high-availability and also to eliminate a single-point-of-failure causing a loss of data or access to data. If a journaling operation can complete faster, then this improves the I/O per second (IOPS) number and lowers the latency experienced by the user(s) of the client devices. In other words, efficient journaling operations results in better performance by the storage nodes 210 and 220.

In case of hardware based HA storage node pairs, interconnect (IC) bandwidth is not a limiting factor due to the high-bandwidth/low-latency technologies being used (e.g., RDMA over Converged Ethernet (RoCE)/RDMA/iWARP). However, in case of a typical cloud infrastructure or virtual environment, these specialized interconnect technologies are rarely available. Therefore, interconnect functionality is typically realized over TCP/UDP based virtual connections.

The present design has enhanced capabilities of a software stack (e.g., a file system layer 111, an IC layer 113; a file system layer 121, an IC layer 123; a file system layer 236a, an IC layer 236b, an IC transport layer 236c, a device driver 236d; a file system layer 246a, an IC layer 246b, an IC transport layer 246c, a device driver 246d; a file system layer 336a, an IC layer 336b, an IC transport layer 336c, a device driver 336d; a file system layer 346a, an IC layer 346b, an IC transport layer 346c, a device driver 346d) to provide multiple flows (e.g., IC channels 115a-d, IC channels 215a-d, IC channels 315a-d) with an IC transport layer being able to monitor the channels and prevent channels from sharing a same receive queue of a remote peered storage node to better distribute network traffic evenly across queues and processing resources of the remote peered storage node.

The largest consumer of IC bandwidth within the software layers of the storage nodes can be the file system layer. To enable the file system layer to distribute its I/O traffic (e.g., write traffic for persistent storage) across multiple parallel IC channels, the IC layer, IC transport layer, and device driver coordinate multiple (virtual) parallel channels for the file system's consumption to avoid a cloud service provider limitation of single flow while transferring journal log entries from a first storage node (e.g., storage node 110a, 210, 310) to a peered storage node (e.g., storage node 120a, 220, 320).

Figure 3:
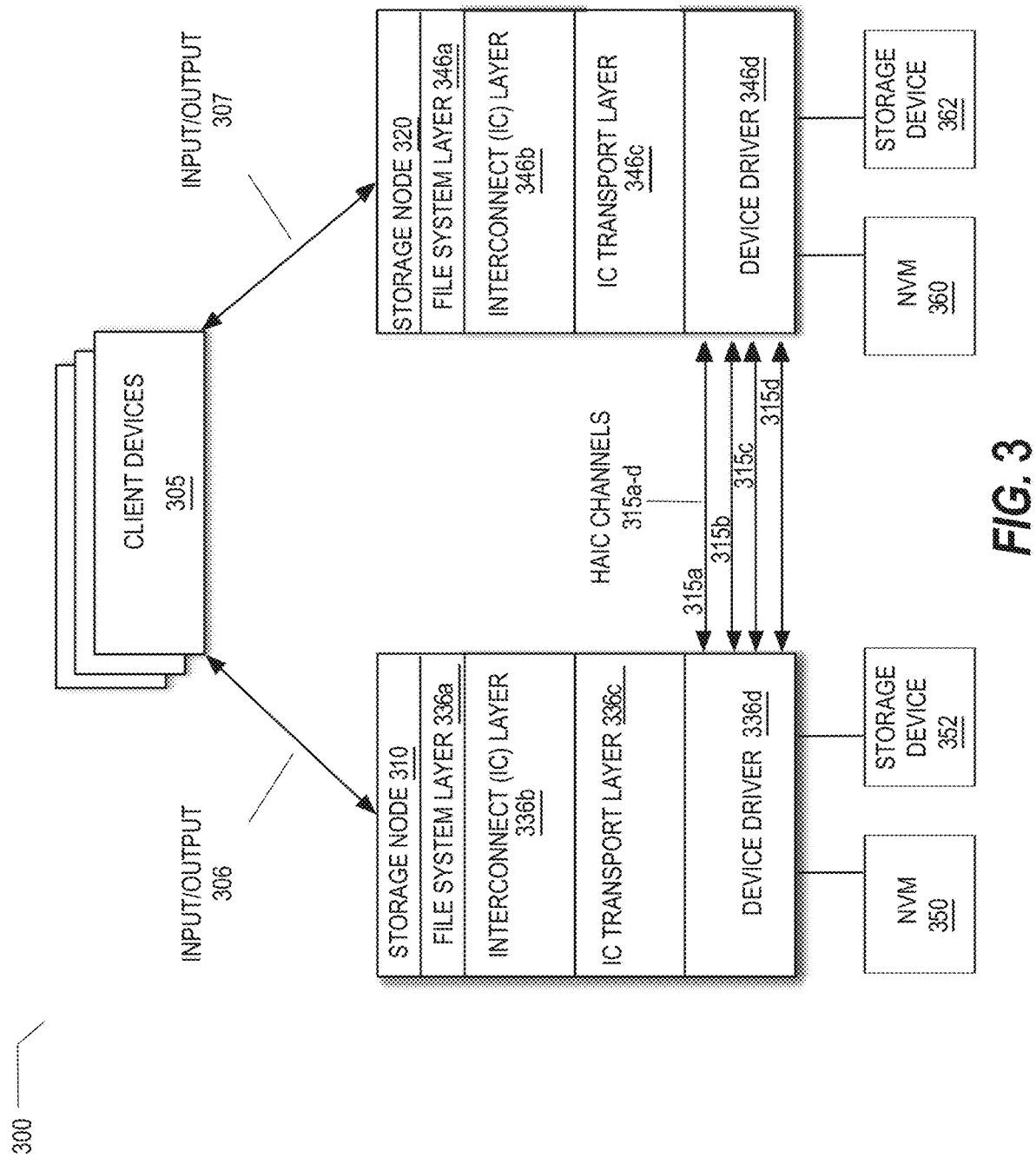
FIG. 3 is a block diagram illustrating a cross-site high-availability distributed cloud storage system to provide multiple communication channels between storage nodes in accordance with another embodiment.

FIG. 3 is a block diagram illustrating a cross-site high-availability distributed cloud storage system to provide multiple communication channels between storage nodes in accordance with another embodiment. In various examples described herein, users of client devices 305 of a multi-site distributed cloud storage system 300 having storage nodes 310 and 320 provide input/output requests 306 to storage node 310 and input/output requests 307 to storage node 320 via a browser-based interface presented on client devices 305.

In the context of the present example, the multi-site distributed cloud storage system 300 includes a storage node 310, a storage node 320, and interconnect (IC) channels 315a, 315b, 315c, and 315d. Additional or fewer IC channels can be supported (e.g., 2-8 channels). The storage nodes are coupled in communication via the IC channels 315a-d, which, depending upon the particular implementation, may be part of a Local Area Network (LAN), a Wide Area Network (WAN), or the Internet.

Turning now to the storage node 310, it includes an operating system with multiple software layers including a file system layer 336a; an IC layer 336b to define IC channels, provide RDMA transport services and correlate RDMA requests to IC channels; an IC transport layer 336c to split data traffic of each IC channel into multiple packets handled by one transport layer session or a group of multiple transport layer sessions; and a device driver 336d (e.g., storage driver, network interface card (NIC) driver) to provide packets into one or more queues with the packets being transmitted with one or more IC channels. Application Programming Interfaces (API) may allow communications to or between these layers. In the context of the present example, the multiple storage nodes 310 and 320 are organized as a cluster and provide a distributed storage architecture to service storage requests 306 and 307 issued by one or more client devices or computer systems of the users. The data served by the storage nodes may be distributed across multiple storage units embodied as persistent storage devices (e.g., non-volatile memory 350, 360), including but not limited to HDDs, SSDs, flash memory systems, or other storage devices (e.g., 352, 362). In a similar manner, storage node 320 includes an operating system with multiple software layers including a file system layer 346a, an IC layer 346b, an IC transport layer 346c, and a device driver 346d.

In one example, a first portion of NVM 350 stores data for the storage node 310 and a second portion of NVM 350 stores mirrored data from the storage node 320. In a similar manner, a first portion of NVM 360 stores data for the storage node 320 and a second portion of NVM 360 stores mirrored data from the storage node 310. If storage node 310 or any communication channels between the storage nodes has a failure, then the second portion of NVM 360 provides a backup copy of data for the storage node 310. If storage node 320 or any communication channels between the storage nodes has a failure, then the second portion of NVM 350 provides a backup copy of data for the storage node 320.

A file system layer provides multiple channels (e.g., IC channels 115a-d, IC channels 215a-d, 315a-d) so that the storage nodes can better scale I/O performance (e.g., write performance) with growing compute instance capabilities in accordance with an embodiment of the present disclosure. In the context of the present example, it is assumed a peered pair of storage nodes, including a local storage node (e.g., storage node 110a, storage node 210, storage node 310) of a distributed cloud storage system and a peered remote storage node (e.g., storage node 120a, storage node 220, storage node 320).

The IC layer provides multiple channels (e.g., IC channels 215a-d, IC channels 315a-d, virtual channels for a virtual implementation, IC channels 521-524) in accordance with an embodiment of the present disclosure. The Interconnect (IC) layer provides a Remote Direct Memory Access (RDMA) transport service for a client (e.g., a file system layer) to implement multiple parallel channels (e.g., multiple virtual channels, or parallel channels for a virtual implementation).

Figure 4:
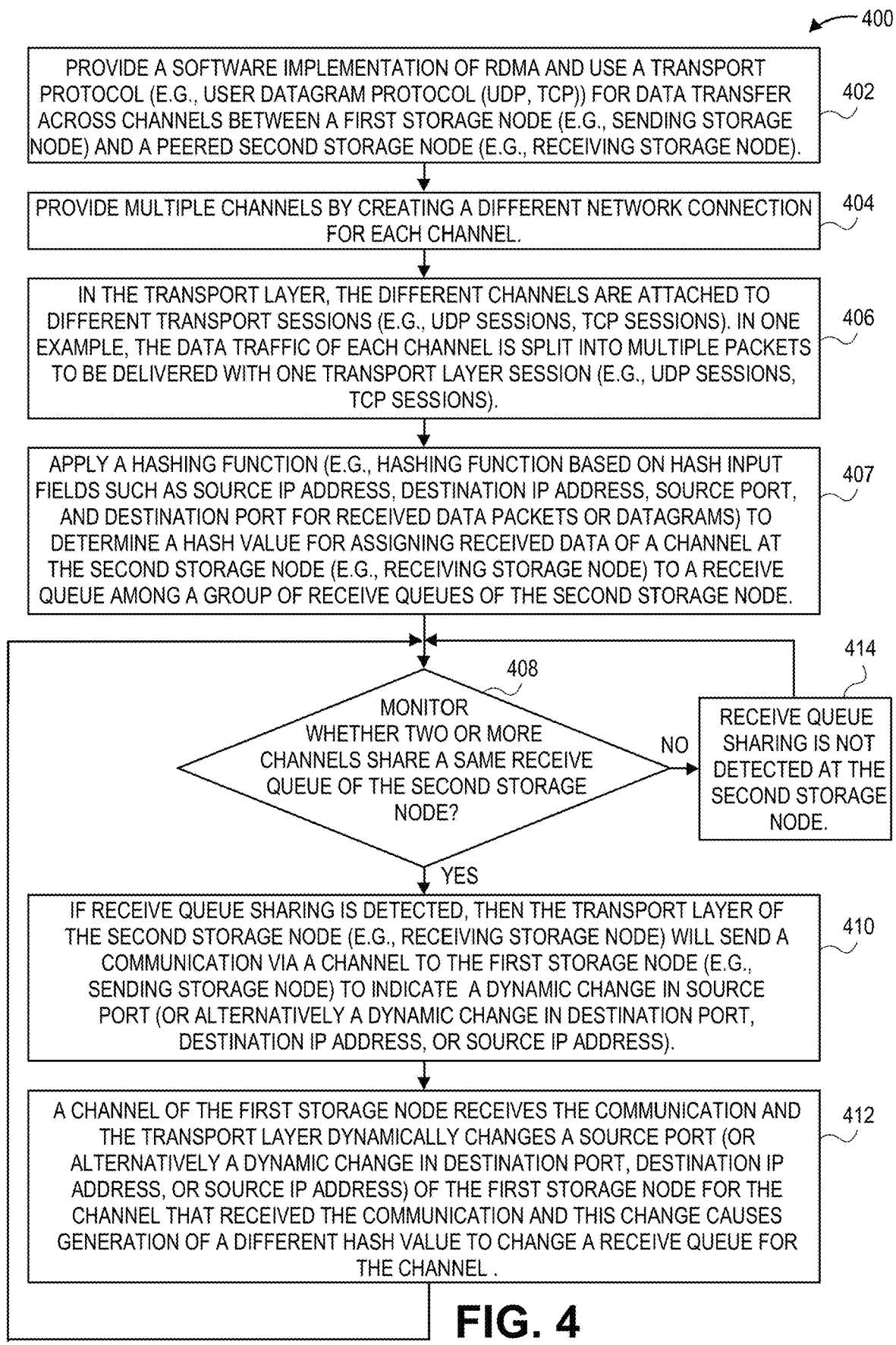
FIG. 4 is a flow diagram illustrating a set of operations of a computer-implemented method 400 to provide, monitor, and prevent multiple channels from sharing a single receive queue of a remote peered storage node in accordance with an embodiment of the present disclosure.

FIG. 4 is a flow diagram illustrating a set of operations of a computer-implemented method 400 to provide, monitor, and prevent multiple channels from sharing a single receive queue of a peered second storage node in accordance with an embodiment of the present disclosure. In one example, a transport layer provides, monitors, and prevents multiple flows (e.g., IC channels 215a-d, 315a-d, virtual channels for a virtual implementation, IC channels 521-524) from sharing a single receive queue of a peered second storage node.

At operation 402, the computer-implemented method 400 (e.g., a transport layer in the IC framework) provides a software implementation of RDMA and uses a transport protocol (e.g., user datagram protocol (UDP, TCP)) for data transfer across channels between a first storage node (e.g., sending storage node, local storage node) and a peered second storage node (e.g., receiving storage node, remote storage node). For this example, the first storage node is sending or transmitting data to the second storage node. The second storage node can also send or transmit data to the first storage node. Some cloud providers limit the maximum bandwidth for a single network connection. For providing multiple channels to upper layers of a software stack, the computer-implemented method 400 (e.g., a transport layer in the IC framework) creates a different network connection for each channel at operation 404. In the transport layer, at operation 406, the different channels are attached to different transport sessions (e.g., UDP sessions, TCP sessions). In one example, the data traffic of each channel is split into multiple packets to be delivered with one transport layer session (e.g., UDP sessions, TCP sessions). A UDP packet includes a header and data section. The header includes a source port number, a destination port number, a length in bytes of the UDP header and UDP data, and a checksum field. UDP is an unreliable protocol. UDP does not have flow control, nor does UDP provide mechanisms to handle packet loss or sort out-of-order packets on the receive side. However, all these missing features in UDP are provided in the IC transport layer based on assigning unique transaction identifiers to each IC request for a channel and providing a data offset for different packets in a transport session to guarantee reliable transmission.

The present design evenly distributes data traffic across different receive queues and different processing resources of the second storage node (e.g., receiving storage node, remote storage node) to reduce processing time and improve performance. At operation 407, the computer-implemented method 400 applies a hashing function (e.g., hashing function based on hash input fields such as source IP address, destination IP address, source port, and destination port for received data packets or datagrams) to determine a hash value for assigning received data from a channel at the second storage node to a receive queue among a group of receive queues of the second storage node. Ideally for optimal performance, each channel is assigned to a single receive queue and no channels share the same receive queue. However, for cloud storage, cloud service providers may not support receive side scaling (RSS) and even if RSS is supported, the cloud service providers use different hashing functions to distribute received data. Furthermore, for the hash input fields (e.g., source IP address, destination IP address, source port, and destination port) used for a receive hash function, the source and destination IP addresses are decided at deployment when source and destination ports are fixed. This can result in network data traffic from different channels being shared by a same receive queue and this causes performance issues. The present design provides a transport protocol to detect channel sharing of a receive queue and quickly change a source port (or other hash input field or tuple) dynamically until each channel has its own receive queue. The changing of a source port (or other hash input field or tuple) until each channel has its own receive queue can occur during storage node boot time (e.g., when a storage node is loading an operating system (e.g., storage OS) into memory) to ensure that the storage node is ready for efficient data transfer (e.g., mirroring data transfer) later.

At operation 408, the computer-implemented method 400 (e.g., a transport layer in the IC framework) continuously monitors receive queue sharing among the channels between the first storage node (e.g., sending storage node, local storage node) and the peered second storage node (e.g., receiving storage node, remote storage node). In other words, the transport layer monitors whether two or more channels share the same receive queue of the second storage node (e.g., receiving storage node, remote storage node). At operation 410, if receive queue sharing is detected at the second storage node (e.g., receiving storage node, remote storage node), then the transport layer of the second storage node will send a communication via a channel to the first storage node (e.g., sending storage node, local storage node) to indicate for the channel a dynamic change in a hash input field or tuple such as a source port (or alternatively a dynamic change in destination port, destination IP address, or source IP address). In one example, the transport layer detects that first and second channels are sharing a first receive queue of the second storage node (e.g., receiving storage node, remote storage node). The second storage node sends a communication via the second channel to the first storage node for dynamically changing a source port for the second channel (or alternatively a dynamic change in destination port, destination IP address, or source IP address).

At operation 412, a channel of the first storage node receives the communication and the transport layer dynamically changes a source port (or alternatively a dynamic change in destination port, destination IP address, or source IP address) for the channel that received the communication and this change causes the generation of a different hash value to change a receive queue for the channel. The source port (or alternatively destination port, destination IP address, or source IP address) can be dynamically changed incrementally or randomly. Incrementally changing a source port (instead of randomly changing) will provide a new hash value with a higher likelihood of switching a channel from a shared receive queue to a different receive queue with no channel sharing to reduce likelihood of receive queue sharing between channels. The method 400 returns to operation 408 to continuously monitor receive queue sharing among the channels.

A hash function generates a new hash value based on changing a value of one hash input field (e.g., source port, destination port, source IP address, destination IP address). A hash input field can be incrementally changed until no channels are sharing a same receive queue. In one embodiment, a source port is incrementally changed until no channels are sharing a same receive queue. A destination port can be changed instead of the source port though debugging operations can be more difficult with a dynamically changing destination port.

At operation 414, for when receive queue sharing is not detected at the second storage node, then the method returns to operation 408 to continuously monitor receive queue sharing among the channels. A generated hash value can be used to do a lookup in a table in order to obtain a queue index to indicate a receive queue.

The numbering of the operations presented is for the sake of clarity and is not intended to prescribe an order of operations in which the various operations must occur. Additionally, operations from the various flow diagrams may be utilized in a variety of combinations (e.g., combining operations 404 and 406).

Figure 5:
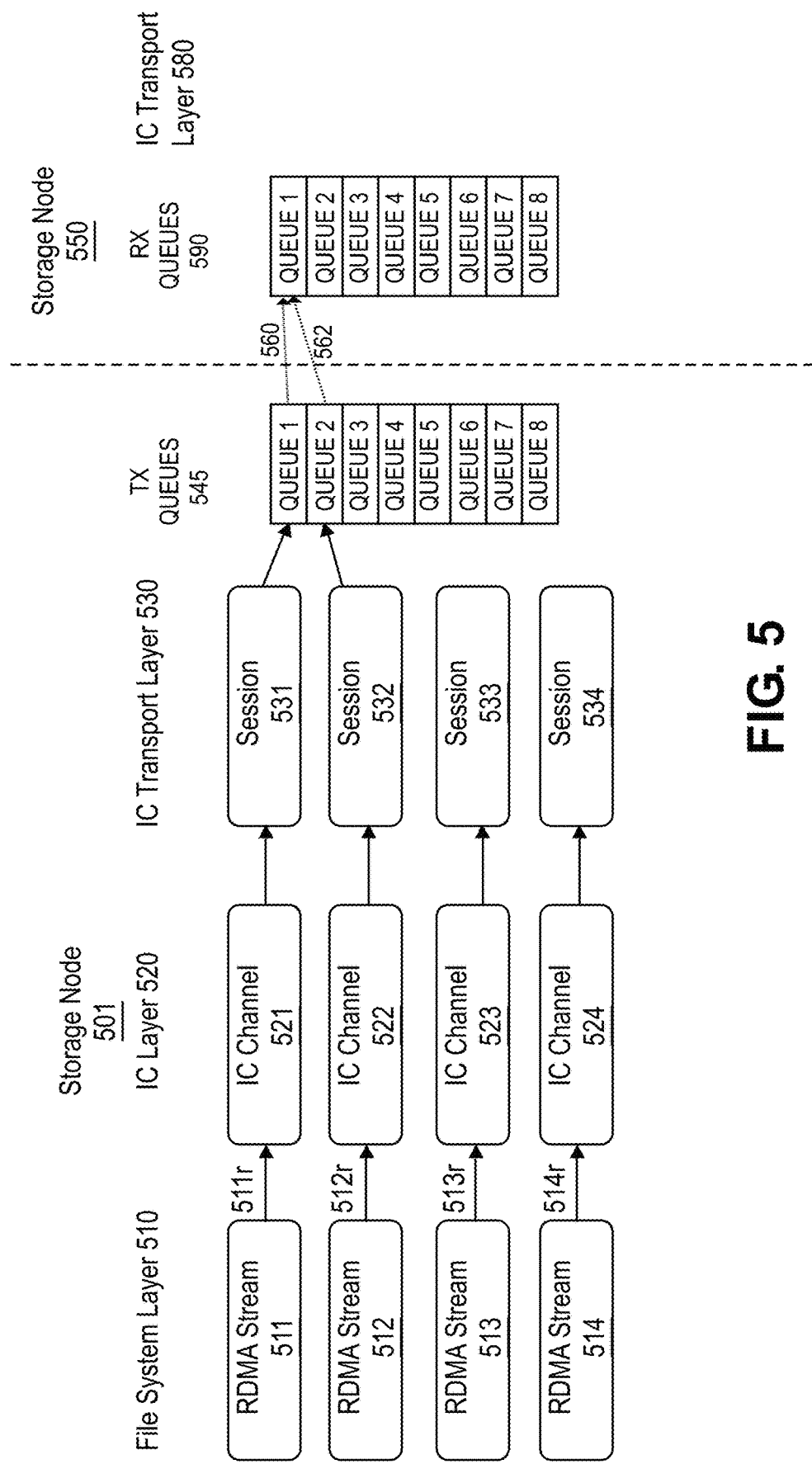
FIG. 5 illustrates a mapping of an IC channel to an IC transport session of a software stack of a storage node and sharing of a receive queue of a remote storage node for different channels in accordance with one embodiment.

FIG. 5 illustrates a mapping of an IC channel to an IC transport session of a software stack of a storage node 501 and sharing of a receive queue of a storage node 550 for different channels in accordance with one embodiment. A file system layer 510 can generate multiple RDMA streams 511-514 for an IP source address. Each RDMA stream handles RDMA requests (e.g., RDMA requests 511r-514r) that are sent to the IC layer 520. The IC transport layers 530 and 580 provide flow control and mechanisms to handle packet loss or sort out-of-order packets on the receive side. In one example, a one to one mapping exists between each IC channel 521-524 and sessions 531-534 (e.g., UDP sessions 531-534) respectively. UDP sessions, or alternatively TCP, can be used for data transfer from the storage node 501 to a remote peer storage node 550. These multiple IC channels and attached UDP sessions can be aggregated to provide high bandwidth, low latency transport medium for environments (e.g., hyperscalers, cloud service providers) that limit or cap the performance of individual IC channels. This aggregation leads to improvement of the overall performance delivered by the storage cluster.

A unique transaction ID and data offset can be added to a header of each packet to allow a device driver to provide the packets into transmit queues 545 including queues 1-8. The transmit queues 545 and receive queues 590 are illustrated with 8 queues but can include any number of queues (e.g., 4, 8, 16, 32, etc.).

For FIG. 5, the session 531 for channel 521 is connected to queue 1 of transmit queues 545 and the session 532 for channel 522 is connected to queue 2. In one example, packets from queue 1 of transmit queues 545 are transferred with session 560 to queue 1 of receive queues 590 while packets from queue 2 of transmit queues 545 are also transferred with session 562 to queue 1.

The method 400 as discussed above continuously monitors receive queue sharing among the channels between the storage node 501 and the peered storage node 550. In other words, the transport layer monitors whether any of channels 521-524 share the same receive queue (e.g., queues 1-8) of the receive queues 590 of the storage node 550. In one example, the transport layer detects that the channels 521 and 522 are sharing a receive queue 1 of the receive queues 590. In one example, the storage node 550 sends a communication via the channel 522 to the storage node 501 for dynamically changing a source port for the channel 522 (or alternatively a dynamic change in destination port, destination IP address, or source IP address).

Figure 6:
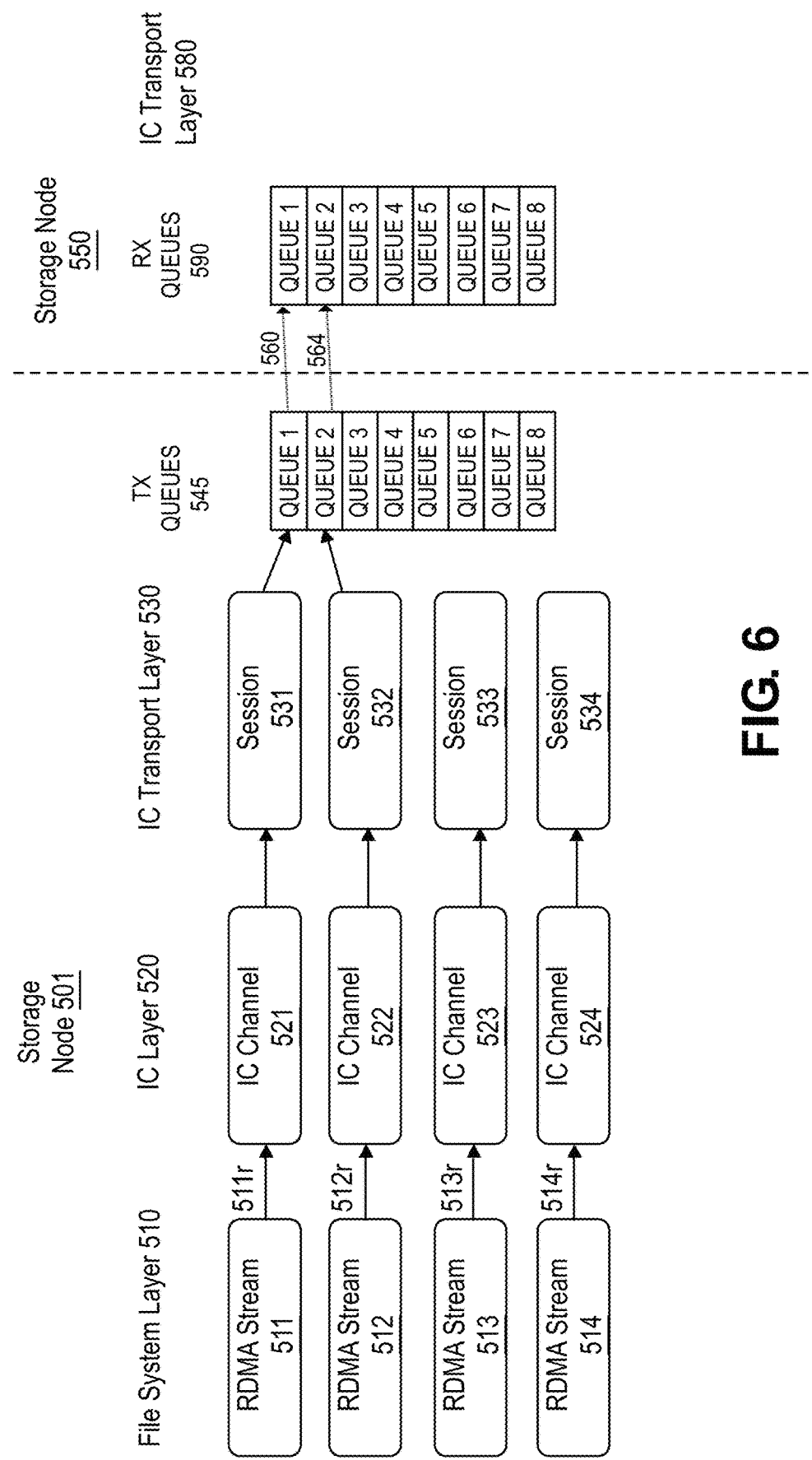
FIG. 6 illustrates a mapping of an IC channel to an IC transport session of a software stack of a storage node with each channel being assigned to a different receive queue of a remote storage node in accordance with one embodiment.

The storage node 501 receives the communication and the transport layer dynamically changes a source port (or alternatively a dynamic change in destination port, destination IP address, or source IP address) for the channel 522. The source port (or alternatively destination port, destination IP address, or source IP address) can be dynamically changed incrementally or randomly to create a new hash value and redirect the session 562 to queue 2 of the receive queues 590 or terminate session 562 and create session 564 for channel 522 as illustrated in FIG. 6.

On high-end storage systems, many more traffic flows (e.g., more than 4 UDP sessions or TCP connections as shown in FIG. 5) are needed in order to fully utilize the system network bandwidth. A traffic flow can be a TCP connection or a UDP session. A session is a state of information exchange. A connection may have multiple sessions.

Device Driver

A device driver communicates with an IC transport layer that has been described in conjunction with operations of FIGS. 1-6. A device driver (e.g., network interface card (NIC) driver, storage driver, device driver 236d, 246d, 336d, 346d) allows communication between the storage node and external storage devices or storage nodes. A packet out-of-order issue may be a big penalty to performance. This issue has to be minimized or avoided on both send and receive sides of storage nodes. In order to have better performance, a multi-queue feature is enabled for both sending and receiving of data packets. On the send side of a storage node, the packets need to be correctly built to make sure an out-of-order issue does not occur (or is minimized) with the multi-queue feature. On the receive side of the storage node, each queue may be processed by a different processing resource (e.g., CPU). In one example, a first queue is processed by a first CPU, a second queue is processed by a second CPU, and a third queue is processed by a third CPU. Thus, each channel has one send queue on one node and one receive queue on the peered node. Each physical network interface card (NIC) or network adapter can be associated with one or more unique IP addresses. The device driver is software to control the NIC or network adapter.

Example Storage Node

Figure 7:
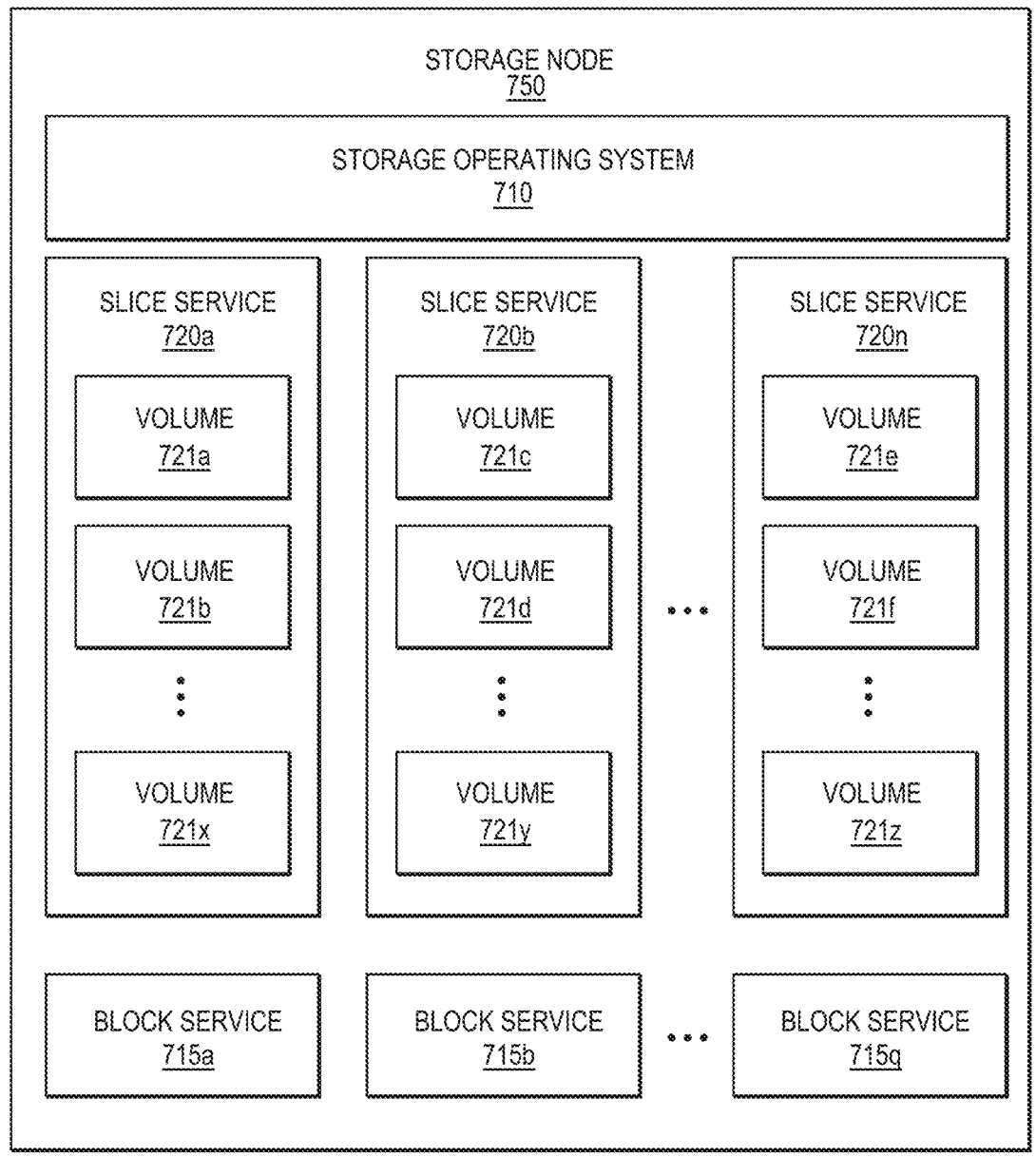
FIG. 7 is a block diagram illustrating a storage node 450 in accordance with an embodiment of the present disclosure.

FIG. 7 is a block diagram illustrating a storage node 750 in accordance with an embodiment of the present disclosure. The storage node 750 represents a non-limiting example of storage nodes (e.g., 110a, 120a, 210, 220, 310, 320) described herein. In the context of the present example, storage node 700 includes a storage operating system 710, one or more slice services 720a-n, and one or more block services 715a-q. The storage operating system (OS) 710 may include a file system layer, an IC layer, an IC transport layer, and a device driver as illustrated in FIGS. 1-3. The storage operating system (OS) can be implemented with a virtual machine or in a private or public cloud. The storage operating system (OS) 710 may provide access to data stored by the storage node 750 via various protocols (e.g., small computer system interface (SCSI), Internet small computer system interface (iSCSI), Fibre Channel (FC), common Internet file system (CIFS), network file system (NFS), hypertext transfer protocol (HTTP), web-based distributed authoring and versioning (WebDAV), or a custom protocol. A non-limiting example of the storage OS 710 is NetApp Element Software (e.g., the SolidFire Element OS) based on Linux and designed for SSDs and scale-out architecture with the ability to expand up to 100 storage nodes.

Each slice service 720 may include one or more volumes (e.g., volumes 721a-x, volumes 721c-y, and volumes 721e-z). Client systems (not shown) associated with an enterprise may store data to one or more volumes, retrieve data from one or more volumes, and/or modify data stored on one or more volumes.

The slice services 720a-n and/or the client system may break data into data blocks. Block services 715a-q and slice services 720a-n may maintain mappings between an address of the client system and the eventual physical location of the data block in respective storage media of the storage node 700. In one embodiment, volumes 721 include unique and uniformly random identifiers to facilitate even distribution of a volume's data throughout a cluster. The slice services 720a-n may store metadata that maps between client systems and block services 715. For example, slice services 720 may map between the client addressing used by the client systems (e.g., file names, object names, block numbers, etc. such as Logical Block Addresses (LBAs)) and block layer addressing (e.g., block IDs) used in block services 715. Further, block services 715 may map between the block layer addressing (e.g., block identifiers) and the physical location of the data block on one or more storage devices. The blocks may be organized within bins maintained by the block services 715 for storage on physical storage devices (e.g., SSDs).

As noted above, a bin may be derived from the block ID for storage of a corresponding data block by extracting a predefined number of bits from the block identifiers. In some embodiments, the bin may be divided into buckets or "sublists" by extending the predefined number of bits extracted from the block identifier. A bin identifier may be used to identify a bin within the system. The bin identifier may also be used to identify a particular block service 715a-q and associated storage device (e.g., SSD). A sublist identifier may identify a sublist with the bin, which may be used to facilitate network transfer (or syncing) of data among block services in the event of a failure or crash of the storage node 700. Accordingly, a client can access data using a client address, which is eventually translated into the corresponding unique identifiers that reference the client's data at the storage node 700.

For each volume 721 hosted by a slice service 720, a list of block IDs may be stored with one block ID for each logical block on the volume. Each volume may be replicated between one or more slice services 720 and/or storage nodes 700, and the slice services for each volume may be synchronized between each of the slice services hosting that volume. Accordingly, failover protection may be provided in case a slice service 720 fails, such that access to each volume may continue during the failure condition. More details of NVRAM, NV log, LDMA, RDMA, and an exemplary software architecture of a storage node are described in U.S. Pat. No. 7,493,424, which is incorporated by reference herein. All references cited herein are hereby incorporated by reference in their entireties. However, in the event of a conflict between a definition in the present disclosure and one in a cited reference, the present disclosure controls.

Consistency Groups

Figure 8:
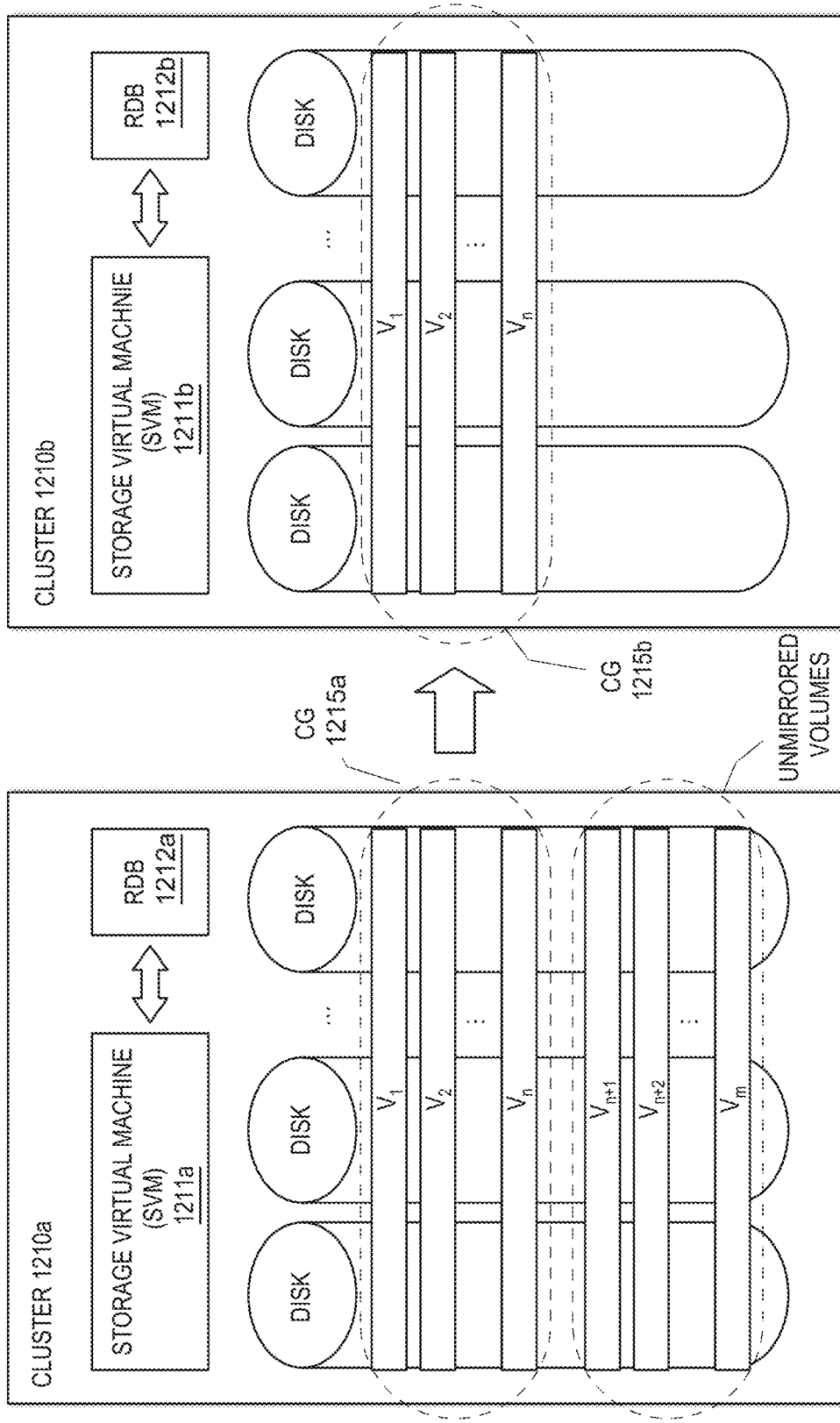
FIG. 8 is a block diagram illustrating the concept of a consistency group (CG) in accordance with an embodiment of the present disclosure.

FIG. 8 is a block diagram illustrating the concept of a consistency group (CG) in accordance with an embodiment of the present disclosure. In the context of the present example, a stretch cluster including two clusters (e.g., cluster 1210*a* and 1210*b*) is shown. The clusters may be part of a cross-site high-availability (HA) solution that supports zero recovery point objective (RPO) and zero recovery time objective (RTO) protections by, among other things, providing a mirror copy of a dataset at a remote location, which is typically in a different fault domain than the location at which the dataset is hosted. For example, cluster 1210*a* may be operable within a first site (e.g., a local data center) and cluster 1210*b* may be operable within a second site (e.g., a remote data center) so as to provide non-disruptive operations even if, for example, an entire data center becomes non-functional, by seamlessly failing over the storage access to the mirror copy hosted in the other data center.

A CG is a collection of storage objects or data containers (e.g., volumes) within a cluster that are managed by a Storage Virtual Machine as a single unit. CGs may also be configured for use in connection with taking simultaneous snapshot images of multiple volumes, for example, to provide crash-consistent copies of a dataset associated with the volumes at a particular point in time. The level of granularity of operations supported by a CG is useful for various types of applications. As a non-limiting example, consider an application, such as a database application, that makes use of multiple volumes, including maintaining logs on one volume and the database on another volume.

The volumes of a CG may span multiple disks (e.g., electromechanical disks and/or SSDs) of one or more storage nodes of the cluster. A CG may include a subset or all volumes of one or more storage nodes. In one example, a CG includes a subset of volumes of a first storage node and a subset of volumes of a second storage node. In another example, a CG includes a subset of volumes of a first storage node, a subset of volumes of a second storage node, and a subset of volumes of a third storage node.

A cluster may include one or more SVMs, each of which may contain data volumes and one or more logical interfaces (LIFs) (not shown) through which they serve data to clients. SVMs may be used to securely isolate the shared virtualized data storage of the storage nodes in the cluster, for example, to create isolated partitions within the cluster. In one embodiment, an LIF includes an Internet Protocol (IP) address and its associated characteristics. Each SVM may have a separate administrator authentication domain and can be managed independently via a management LIF to allow, among other things, definition and configuration of the associated CGs.

In the context of the present example, the SVMs make use of a configuration database (e.g., replicated database (RDB) 1212*a* and 1212*b*), which may store configuration information for their respective clusters. A configuration database provides cluster wide storage for storage nodes within a cluster. The configuration information may include relationship information specifying the status, direction of data replication, relationships, and/or roles of individual CGs, a set of CGs, members of the CGs, and/or the mediator. A pair of CGs may be said to be "peered" when one is protecting the other. For example, a CG (e.g., CG 1215*b*) to which data is configured to be synchronously replicated may be referred to as being in the role of a destination CG, whereas the CG (e.g., CG 1215*a*) being protected by the destination CG may be referred to as the source CG. Various events (e.g., transient or persistent network connectivity issues, availability/unavailability of the mediator, site failure, and the like) impacting the stretch cluster may result in the relationship information being updated at the cluster and/or the CG level to reflect changed status, relationships, and/or roles.

While in the context of various embodiments described herein, a volume of a CG may be described as performing certain actions (e.g., taking other members of a CG out of synchronization, disallowing/allowing access to the dataset or the mirror copy, issuing consensus protocol requests, etc.), it is to be understood such references are shorthand for an SVM or other controlling entity, managing or containing the volume at issue, performing such actions on behalf of the volume.

In addition, those skilled in the art will appreciate a cross-site high-availability (HA) solution may include more than two clusters, in which a mirrored copy of a dataset of a primary (master) cluster is stored on more than one secondary (slave) cluster.

Example Computer System

Embodiments of the present disclosure include various steps, which have been described above. The steps may be performed by hardware components or may be embodied in machine-executable instructions, which may be used to cause a processing resource (e.g., a general-purpose or special-purpose processor) programmed with the instructions to perform the steps. Alternatively, depending upon the particular implementation, various steps may be performed by a combination of hardware, software, firmware and/or by human operators.

Embodiments of the present disclosure may be provided as a computer program product, which may include a non-transitory machine-readable storage medium embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more non-transitory machine-readable storage media containing the code according to embodiments of the present disclosure with appropriate special purpose or standard computer hardware to execute the code contained therein. An apparatus for practicing various embodiments of the present disclosure may involve one or more computers (e.g., physical and/or virtual servers) (or one or more processors within a single computer) and storage systems containing or having network access to computer program(s) coded in accordance with various methods described herein, and the method steps associated with embodiments of the present disclosure may be accomplished by modules, routines, subroutines, or subparts of a computer program product.

Figure 9:
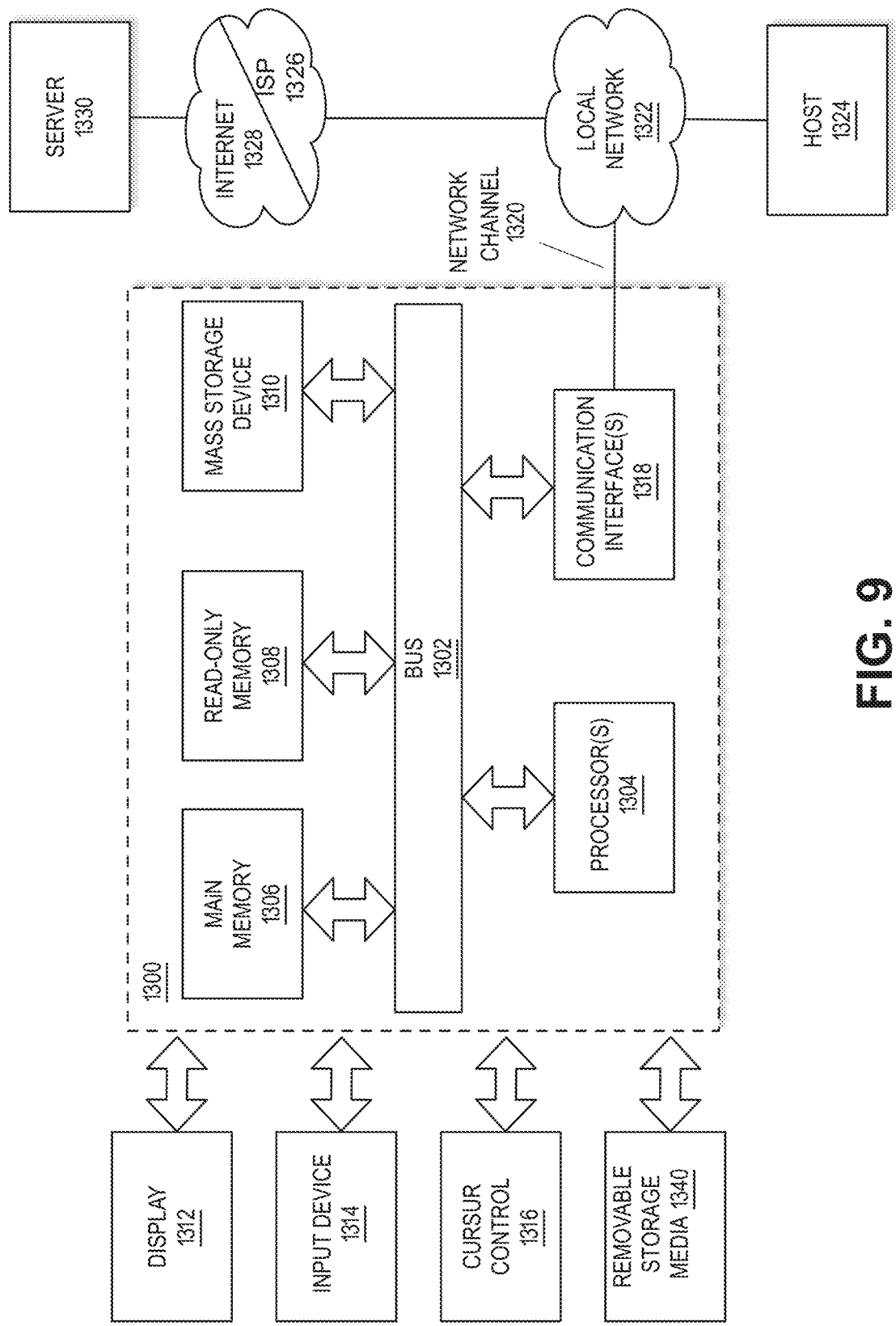
FIG. 9 illustrates an example computer system in which or with which embodiments of the present disclosure may be utilized.

FIG. 9 is a block diagram that illustrates a computer system 1300 in which or with which an embodiment of the present disclosure may be implemented. Computer system 1300 may be representative of all or a portion of the computing resources associated with a node (e.g., storage nodes 110*a*, 120*a*, 210, 220, 310, 320, 501, 550, 750, 1410, 1420, etc.) of a distributed storage system or a storage virtual controller or machine. Notably, components of computer system 1300 described herein are meant only to exemplify various possibilities. In no way should example computer system 1300 limit the scope of the present disclosure. In the context of the present example, computer system 1300 includes a bus 1302 or other communication mechanism for communicating information, and a processing resource (e.g., a hardware processor 1304) coupled with bus 1302 for processing information. Hardware processor 1304 may be, for example, a general purpose microprocessor.

Computer system 1300 also includes a main memory 1306, such as a random access memory (RAM) or other dynamic storage device, coupled to bus 1302 for storing information and instructions to be executed by processor 1304. Main memory 1306 also may be used for storing temporary variables or other intermediate information during execution of instructions to be executed by processor 1304. Such instructions, when stored in non-transitory storage media accessible to processor 1304, render computer system 1300 into a special-purpose machine that is customized to perform the operations specified in the instructions.

Computer system 1300 further includes a read only memory (ROM) 1308 or other static storage device coupled to bus 1302 for storing static information and instructions for processor 1304. A storage device 1310, e.g., a magnetic disk, optical disk or flash disk (made of flash memory chips), is provided and coupled to bus 1302 for storing information and instructions.

Computer system 1300 may be coupled via bus 1302 to a display 1312, e.g., a cathode ray tube (CRT), Liquid Crystal Display (LCD), Organic Light-Emitting Diode Display (OLED), Digital Light Processing Display (DLP) or the like, for displaying information to a computer user. An input device 1314, including alphanumeric and other keys, is coupled to bus 1302 for communicating information and command selections to processor 1304. Another type of user input device is cursor control 1316, such as a mouse, a trackball, a trackpad, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane.

Removable storage media 1340 can be any kind of external storage media, including, but not limited to, hard-drives, floppy drives, IOMEGA® Zip Drives, Compact Disc-Read Only Memory (CD-ROM), Compact Disc—Re-Writable (CD-RW), Digital Video Disk-Read Only Memory (DVD-ROM), USB flash drives and the like.

Computer system 1300 may implement the techniques described herein using customized hard-wired logic, one or more ASICs or FPGAs, firmware or program logic which in combination with the computer system causes or programs computer system 1300 to be a special-purpose machine. According to one embodiment, the techniques herein are performed by computer system 1300 in response to processor 1304 executing one or more sequences of one or more instructions contained in main memory 1306. Such instructions may be read into main memory 1306 from another storage medium, such as storage device 1310. Execution of the sequences of instructions contained in main memory 1306 causes processor 1304 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical, magnetic or flash disks, such as storage device 1310. Volatile media includes dynamic memory, such as main memory 1306. Common forms of storage media include, for example, a flexible disk, a hard disk, a solid state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1302. Transmission media can also take the form of acoustic or light waves, such as those generated during radio-wave and infra-red data communications.

Various forms of media may be involved in carrying one or more sequences of one or more instructions to processor 1304 for execution. For example, the instructions may initially be carried on a magnetic disk or solid state drive of a remote computer. The remote computer can load the instructions into its dynamic memory and send the instructions over a telephone line using a modem. A modem local to computer system 1300 can receive the data on the telephone line and use an infra-red transmitter to convert the data to an infra-red signal. An infra-red detector can receive the data carried in the infra-red signal and appropriate circuitry can place the data on bus 1302. Bus 1302 carries the data to main memory 1306, from which processor 1304 retrieves and executes the instructions. The instructions received by main memory 1306 may optionally be stored on storage device 1310 either before or after execution by processor 1304.

Computer system 1300 also includes a communication interface 1318 coupled to bus 1302. Communication interface 1318 provides a two-way data communication coupling to a network channel 1320 that is connected to a local network 1322. For example, communication interface 1318 may be an integrated services digital network (ISDN) card, cable modem, satellite modem, or a modem to provide a data communication connection to a corresponding type of telephone line. As another example, communication interface 1318 may be a local area network (LAN) card to provide a data communication connection to a compatible LAN. Wireless channels may also be implemented. In any such implementation, communication interface 1318 sends and receives electrical, electromagnetic or optical signals that carry digital data streams representing various types of information.

Network channel 1320 typically provides data communication through one or more networks to other data devices. For example, network channel 1320 may provide a connection through local network 1322 to a host computer 1324 or to data equipment operated by an Internet Service Provider (ISP) 1326. ISP 1326 in turn provides data communication services through the world wide packet data communication network now commonly referred to as the "Internet" 1328. Local network 1322 and Internet 1328 both use electrical, electromagnetic or optical signals that carry digital data streams. The signals through the various networks and the signals on network channel 1320 and through communication interface 1318, which carry the digital data to and from computer system 1300, are example forms of transmission media.

Computer system 1300 can send messages and receive data, including program code, through the network(s), network channel 1320 and communication interface 1118. In the Internet example, a server 1330 might transmit a requested code for an application program through Internet 1328, ISP 1326, local network 1322 and communication interface 1318. The received code may be executed by processor 1104 as it is received, or stored in storage device 1310, or other non-volatile storage for later execution.

Figure 10:
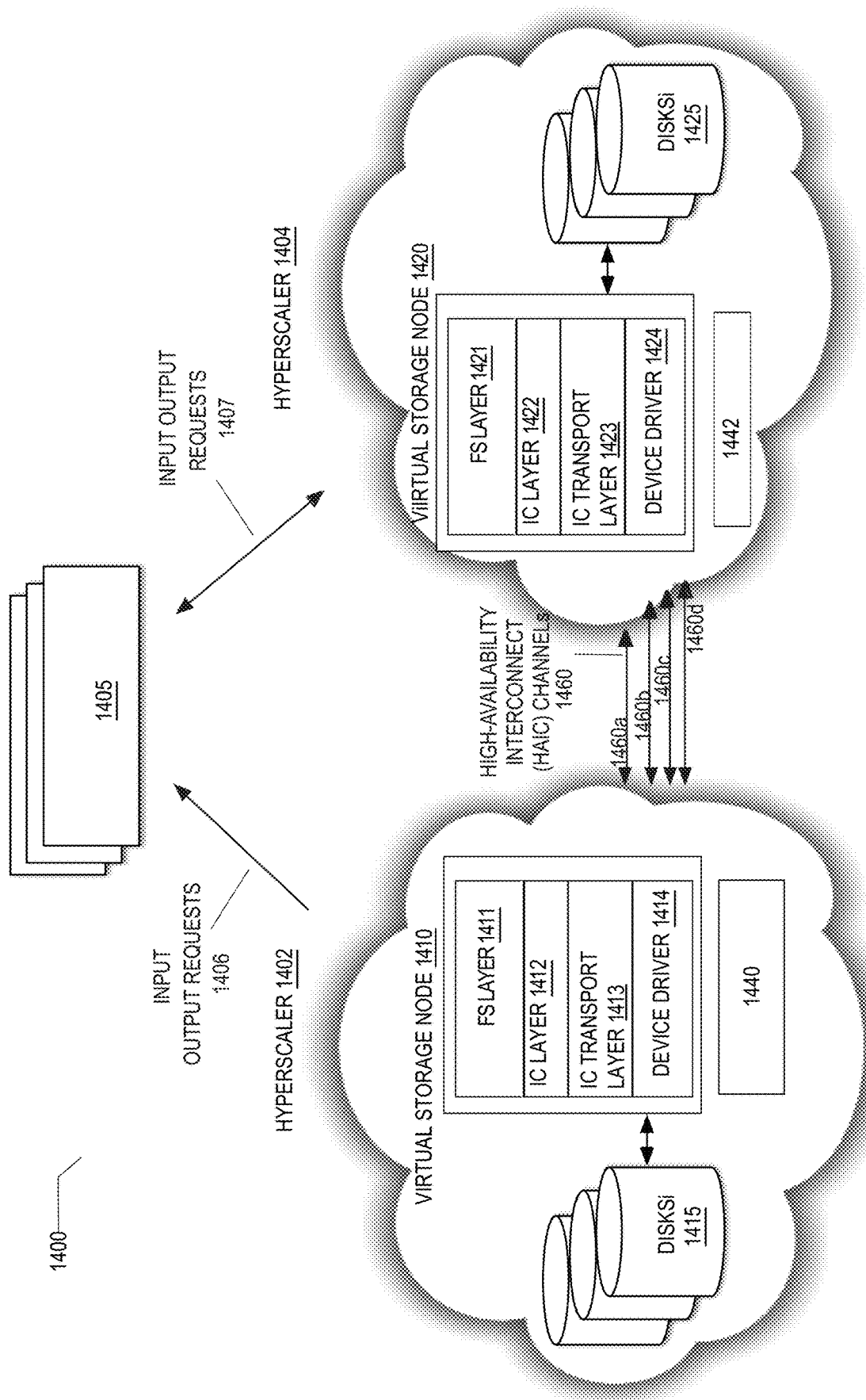
FIG. 10 is a block diagram illustrating a cloud environment in which various embodiments may be implemented.

FIG. 10 is a block diagram illustrating a cloud environment in which various embodiments may be implemented. In various examples described herein, a virtual storage system 1400 may be run (e.g., on a VM or as a containerized instance, as the case may be) within a public cloud provider (e.g., hyperscaler 1402, 1404). In the context of the present example, the virtual storage system 1400 includes virtual storage nodes 1410 and 1420 and makes use of cloud disks (e.g., hyperscale disks 1415, 1425) provided by the hyperscaler.

The virtual storage system 1400 may present storage over a network to clients 1405 using various protocols (e.g., small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol. Clients 1405 may request services of the virtual storage system 1400 by issuing Input/Output requests 1406, 1407 (e.g., file system protocol messages (in the form of packets) over the network). A representative client of clients 1405 may comprise an application, such as a database application, executing on a computer that "connects" to the virtual storage system over a computer network, such as a point-to-point channel, a shared local area network (LAN), a wide area network (WAN), or a virtual private network (VPN) implemented over a public network, such as the Internet.

In the context of the present example, the virtual storage system 1400 includes virtual storage nodes 1410 and 1420 with each virtual storage node being shown including a number of layers. The virtual storage node 1410 includes a file system (FS) layer 1411, IC layer 1412, IC transport layer 1413, and device driver 1414. The virtual storage node 1420 includes a file system (FS) layer 1421, IC layer 1422, IC transport layer 1423, and device driver 1424. These layers may represent components of data management software (not shown) of the virtual storage system 1400. The file system layer generally defines the basic interfaces and data structures in support of file system operations (e.g., initialization, mounting, unmounting, creating files, creating directories, opening files, writing to files, and reading from files). According to one embodiment, the IC layer makes use of the IC transport layer to encapsulate RDMA frames within Ethernet packets for transmission via the HAIC channels 1460a-1460d. The storage device driver may include storage device drivers for interacting with the various types of hyperscale disks 1415, 1425 supported by the hyperscalers.

The data served by the virtual storage nodes may be distributed across multiple storage units embodied as persistent storage devices (e.g., non-volatile memory 1440, 1442), including but not limited to HDDs, SSDs, flash memory systems, or other storage devices (e.g., 1415, 1425).

Systems and methods are described for a cross-site high-availability distributed cloud storage system to provide multiple channels between storage nodes. According to some embodiments for Example 1, a computer implemented method performed by one or more processing resources of a first storage node or a second storage node of a distributed cloud storage system, comprises providing multiple channels between the first storage node and the second storage node with each channel having a separate network connection for packets of a transport layer session; assigning packets from each channel to a group of receive queues of the second storage node; continuously monitoring whether two or more channels of the multiple channels share a same receive queue of the second storage node; and sending a communication via a channel to the first storage node to indicate a dynamic change for a hash input field including one of a source port, a destination port, a source internet protocol (IP) address, and a destination IP address when two or more channels of the multiple channels share a same receive queue of the second storage node.

Example 2 includes the subject matter of Example 1, further comprising dynamically changing one of a source port, a destination port, a source IP address, and a destination IP address for the channel that received the communication from the second storage node.

Example 3 includes the subject matter of any of Examples 1-2, further comprising dynamically changing a source port for the channel that received the communication from the second storage node.

Example 4 includes the subject matter of any of Examples 1-3, further comprising dynamically changing a destination port for the channel that received the communication from the second storage node.

Example 5 includes the subject matter of any of Examples 1-4, further comprising providing a software implementation of RDMA and using a transport for data transfer across the channels between the first storage node and the second storage node.

Example 6 includes the subject matter of any of Examples 1-5, further comprising applying a hashing function based on hash input fields including source IP address, destination IP address, source port, and destination port for received packets to determine a hash value for assigning received packets from a channel to a receive queue among the group of receive queues of the second storage node.

Example 7 includes the subject matter of any of Examples 1-6, further comprising dynamically incrementally changing a source port for the channel that received the communication from the second storage node until the channel does not share a receive queue with any other channels.

Example 8 includes the subject matter of any of Examples 1-7, further comprising performing a data transfer using the multiple channels in order to replicate copies of a journal log of data transfer requests from the first storage node to the second storage node.

Example 9 is a storage node for use in a multi-site distributed storage system. The storage node comprises one or more processing resources; and a non-transitory computer-readable medium coupled to the one or more processing resources, having stored therein instructions, which when executed by the one or more processing resources cause the one or more processing resources to provide multiple channels between an additional storage node and the storage node with each channel having a separate network connection for packets of a transport layer session; assign packets from each channel to a group of receive queues of the storage node; continuously monitor whether two or more channels of the multiple channels share a same receive queue of the storage node; and send a communication via a channel to the additional storage node to indicate a dynamic change for a hash input field including one of a source port, a destination port, a source internet protocol (IP)

address, and a destination IP address when two or more channels of the multiple channels share a same receive queue of the storage node.

Example 10 includes the subject matter of Example 9, wherein the communication to indicate a change of a source port for the channel that received the communication from the storage node.

Example 11 includes the subject matter of Example 9, wherein the communication to indicate a change of a destination port for the channel that received the communication from the storage node.

Example 12 includes the subject matter of any of Examples 9-11, wherein the instructions when executed by the one or more processing resources cause the one or more processing resources to apply a hashing function based on hash input fields including source IP address, destination IP address, source port, and destination port for received packets to determine a hash value for assigning received packets from a channel to a receive queue among the group of receive queues of the storage node.

Example 13 includes the subject matter of any of Examples 9-12, wherein the instructions when executed by the processing resource cause the processing resource to receive a data transfer using the multiple channels in order to replicate copies of a journal log of data transfer requests from the additional storage node to the storage node.

Example 14 is a non-transitory computer-readable storage medium embodying a set of instructions, which when executed by one or more processing resources of a first storage node or a second storage node of a distributed cloud storage system cause the one or more processing resources to provide multiple channels between the first storage node and the second storage node with each channel having a separate network connection for packets of a transport layer session; assign packets from each channel to a group of receive queues of the second storage node; continuously monitor whether two or more channels of the multiple channels share a same receive queue of the second storage node; and send a communication via a channel to the first storage node to indicate a dynamic change for a hash input field including one of a source port, a destination port, a source internet protocol (IP) address, and a destination IP address when two or more channels of the multiple channels share a same receive queue of the second storage node.

Example 15 includes the subject matter of Example 14, wherein the set of instructions when executed by the one or more processing resources cause the one or more processing resources to dynamically change one of a source port, a destination port, a source IP address, and a destination IP address for the channel that received the communication from the second storage node.

Example 16 includes the subject matter of any of Examples 14-15, wherein the set of instructions when executed by the one or more processing resources cause the one or more processing resources to dynamically change a source port for the channel that received the communication from the second storage node.

Example 17 includes the subject matter of any of Examples 14-16, wherein the set of instructions when executed by the one or more processing resources cause the one or more processing resources to dynamically change a destination port for the channel that received the communication from the second storage node.

Example 18 includes the subject matter of any of Examples 14-17, wherein the set of instructions when executed by the one or more processing resources cause the one or more processing resources to provide a software implementation of RDMA and using a transport for data transfer across the channels between the first storage node and the second storage node.

Example 19 includes the subject matter of any of Examples 14-18, wherein the set of instructions when executed by the one or more processing resources cause the one or more processing resources to apply a hashing function based on hash input fields including source IP address, destination IP address, source port, and destination port for received packets to determine a hash value for assigning received packets from a channel to a receive queue among the group of receive queues of the second storage node.

Example 20 includes the subject matter of any of Examples 14-19, wherein the set of instructions when executed by the one or more processing resources cause the one or more processing resources to dynamically incrementally change a source port for the channel that received the communication from the second storage node until the channel does not share a receive queue with any other channels.

What is claimed is:

1. A computer implemented method performed by one or more processing resources of a first storage node or a second storage node of a distributed cloud storage system, the computer implemented method comprising:
    providing multiple channels between the first storage node and the second storage node with each channel having a separate network connection for data of a transport layer session;
    in a transport layer, attaching the multiple channels to different transport sessions;
    distributing data traffic from the multiple channels across different receive queues and associated processing resources of the second storage node to reduce processing time and improve performance; and
    continuously monitoring, with the transport layer, whether two or more channels of the multiple channels share a same receive queue of the second storage node.

2. The computer implemented method of claim 1, further comprising: sending a communication via a channel of the multiple channels from the second storage node to the first storage node to indicate a change for a hash input field including one of a source port, a destination port, a source internet protocol (IP) address, and a destination IP address when two or more channels of the multiple channels share a same receive queue of the second storage node.

3. The computer implemented method of claim 2, further comprising:
    dynamically changing one of a source port, a destination port, a source IP address, and a destination IP address for the channel that received the communication from the second storage node.

4. The computer implemented method of claim 2, further comprising: dynamically changing a source port for the channel that received the communication from the second storage node.

5. The computer implemented method of claim 2, further comprising: dynamically changing a destination port for the channel that received the communication from the second storage node.

6. The computer implemented method of claim 1, further comprising:
    providing, with the transport layer, a software implementation of Remote Direct Memory Access (RDMA) and using a transport protocol for data transfer across the channels between the first storage node and the second storage node.

7. The computer implemented method of claim 1, further comprising: applying a hashing function based on hash input fields including source IP address, destination IP address, source port, and destination port for received packets to determine a hash value for assigning received packets from a channel of the multiple channels to a receive queue among the group of receive queues of the second storage node.

8. The computer implemented method of claim 2, further comprising: dynamically incrementally changing a source port for the channel that received the communication from the second storage node until the channel does not share a receive queue with any other channels.

9. A storage node for use in a multi-site distributed storage system, the storage node comprising:
one or more processing resources; and
a non-transitory computer-readable medium coupled to the one or more processing resources, having stored therein instructions, which when executed by the one or more processing resources cause the one or more processing resources to:
provide multiple channels between an additional storage node and the storage node with each channel having a separate network connection for data of a transport layer session;
attach the multiple channels to different transport sessions;
distribute data traffic from the multiple channels across different receive queues and associated processing resources of the storage node to reduce processing time and improve performance; and
continuously monitor whether two or more channels of the multiple channels share a same receive queue of the storage node.

10. The storage node of claim 9, wherein the instructions when executed by the one or more processing resources cause the one or more processing resources to: send a communication via a channel of the multiple channels from the storage node to the additional storage node to indicate a change for a hash input field including one of a source port, a destination port, a source internet protocol (IP) address, and a destination IP address when two or more channels of the multiple channels share a same receive queue of the storage node.

11. The storage node of claim 10, wherein the instructions when executed by the one or more processing resources cause the one or more processing resources to:
dynamically change one of a source port, a destination port, a source IP address, and a destination IP address for the channel that received the communication from the storage node.

12. The storage node of claim 10, wherein the instructions when executed by the one or more processing resources cause the one or more processing resources to: dynamically change a source port for the channel that received the communication from the storage node.

13. The storage node of claim 10, wherein the instructions when executed by the one or more processing resources cause the one or more processing resources to: dynamically change a destination port for the channel that received the communication from the storage node.

14. A non-transitory computer-readable storage medium embodying a set of instructions, which when executed by one or more processing resources of a first storage node or a second storage node of a distributed cloud storage system cause the one or more processing resources to:
provide multiple channels between the first storage node and the second storage node with each channel having a separate network connection for data of a transport layer session;
in a transport layer, attach the multiple channels to different transport layer sessions;
distribute data traffic from the multiple channels across different receive queues and associated processing resources of the second storage node to reduce processing time and improve performance; and
continuously monitoring, with the transport layer, whether two or more channels of the multiple channels share a same receive queue of the second storage node.

15. The non-transitory computer-readable storage medium of claim 14, wherein the set of instructions when executed by the one or more processing resources cause the one or more processing resources to: send a communication via a channel of the multiple channels from the second storage node to the first storage node to indicate a change for a hash input field including one of a source port, a destination port, a source internet protocol (IP) address, and a destination IP address when two or more channels of the multiple channels share a same receive queue of the second storage node; and dynamically change one of a source port, a destination port, a source IP address, and a destination IP address for the channel that received the communication from the second storage node.

16. The non-transitory computer-readable storage medium of claim 15, wherein the set of instructions when executed by the one or more processing resources cause the one or more processing resources to: dynamically change a source port for the channel that received the communication from the second storage node.

17. The non-transitory computer-readable storage medium of claim 15, wherein the set of instructions when executed by the one or more processing resources cause the one or more processing resources to: dynamically change a destination port for the channel that received the communication from the second storage node.

18. The non-transitory computer-readable storage medium of claim 14, wherein the set of instructions when executed by the one or more processing resources cause the one or more processing resources to:
provide a software implementation of Remote Direct Memory Access (RDMA) and using a transport protocol for data transfer across the channels between the first storage node and the second storage node.

19. The non-transitory computer-readable storage medium of claim 14, wherein the set of instructions when executed by the one or more processing resources cause the one or more processing resources to: apply a hashing function based on hash input fields including source IP address, destination IP address, source port, and destination port for received packets to determine a hash value for assigning received packets from a channel of the multiple channels to a receive queue among the group of receive queues of the second storage node.

20. The non-transitory computer-readable storage medium of claim 15, wherein the set of instructions when executed by the one or more processing resources cause the one or more processing resources to: dynamically incrementally change a source port for the channel that received the communication from the second storage node until the channel does not share a receive queue with any other channels.

* * * * *